United States Patent
Kamdar et al.

(10) Patent No.: US 8,046,414 B2
(45) Date of Patent: Oct. 25, 2011

(54) METHOD FOR ACCESSING EMAIL ATTACHMENTS FROM A MOBILE VEHICLE

(75) Inventors: Hitan S. Kamdar, Utica, MI (US); Shpetim Veliu, Livonia, MI (US)

(73) Assignee: General Motors LLC, Detroit, MI (US)

( * ) Notice: Subject to any disclaimer, the term of this patent is extended or adjusted under 35 U.S.C. 154(b) by 2333 days.

(21) Appl. No.: 10/690,125

(22) Filed: Oct. 21, 2003

(65) Prior Publication Data
US 2005/0086310 A1 Apr. 21, 2005

(51) Int. Cl.
*G06F 15/16* (2006.01)

(52) U.S. Cl. .......................................... 709/206; 709/217

(58) Field of Classification Search .................. 709/203, 709/206, 217–219, 220–221, 207, 227, 238
See application file for complete search history.

(56) References Cited

U.S. PATENT DOCUMENTS

| | | | |
|---|---|---|---|
| 6,219,694 B1 * | 4/2001 | Lazaridis et al. | 709/206 |
| 6,757,712 B1 * | 6/2004 | Bastian et al. | 709/206 |
| 6,801,932 B1 * | 10/2004 | Picoult et al. | 709/206 |
| 6,857,007 B1 * | 2/2005 | Bloomfield | 709/206 |
| 6,862,630 B1 * | 3/2005 | Garg et al. | 709/250 |
| 6,981,023 B1 * | 12/2005 | Hamilton et al. | 709/206 |
| 7,092,735 B2 * | 8/2006 | Osann, Jr. | 455/556.1 |
| 7,136,902 B1 * | 11/2006 | Ruckart | 709/206 |
| 7,689,253 B2 * | 3/2010 | Basir | 455/563 |

* cited by examiner

*Primary Examiner* — Faruk Hamza

(74) *Attorney, Agent, or Firm* — Anthony L. Simon; Reising Ethington P.C.

(57) ABSTRACT

A method for accessing email attachments from a mobile vehicle is disclosed. The method enables the user to contact a call center, and receive email attachments in a mobile vehicle telematics control unit. The telematics control unit determines whether the email attachment is audio-only, or whether it includes video elements. The telematics control unit then routes audio-only attachments to an audio device, and attachments having video elements to a display screen.

21 Claims, 3 Drawing Sheets

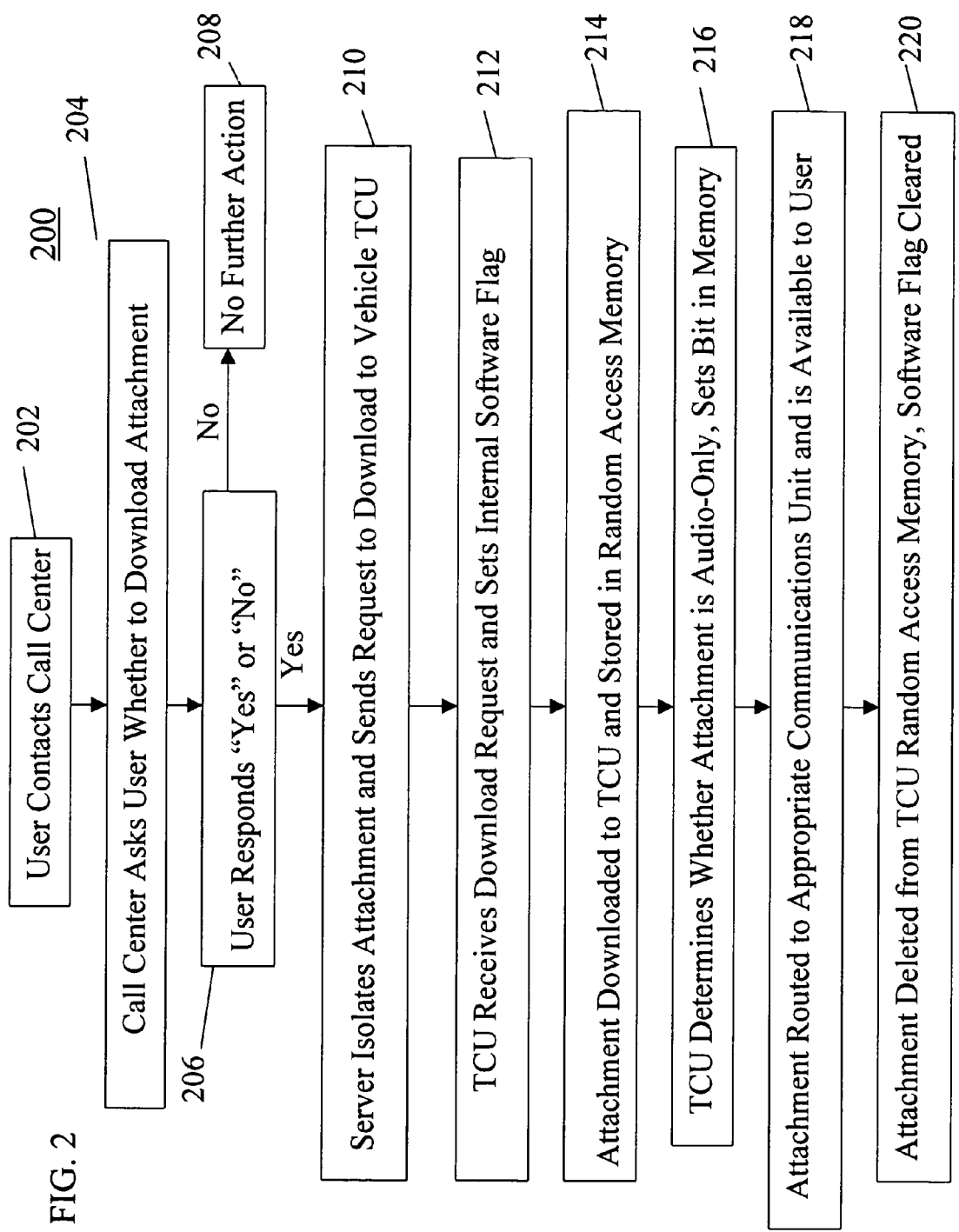

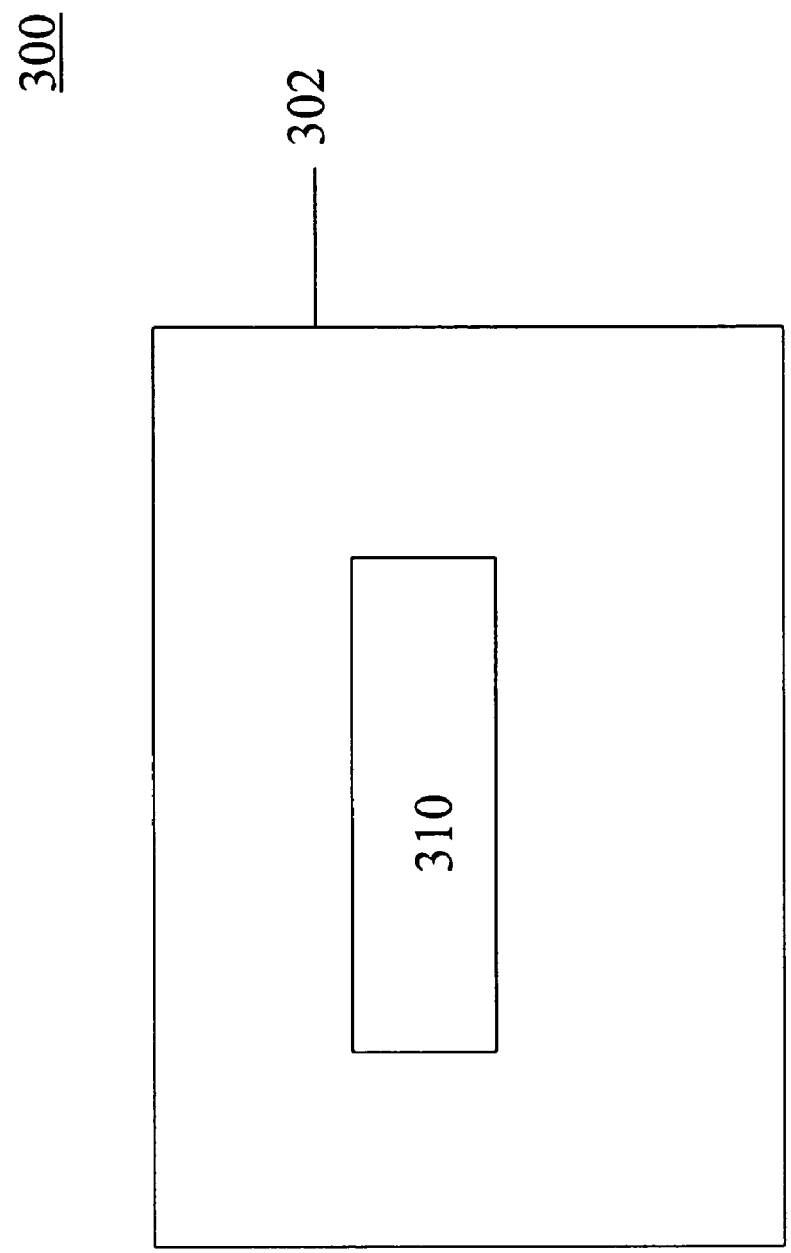

METHOD FOR ACCESSING EMAIL ATTACHMENTS FROM A MOBILE VEHICLE

FIELD OF THE INVENTION

The invention relates generally to wireless communication devices for use in a vehicle. More specifically, the invention relates to a method and system for receiving email attachments in a vehicle.

BACKGROUND OF THE INVENTION

Telematic communication units (TCUs) such as cellular phones, personal data assistants (PDA's), Global Positioning System (GPS) devices, and on-board Vehicle Communication Units (VCU's), used in conjunction with a Wide Area Network (WAN), such as a cellular telephone network or a satellite communication system, have made it possible for a person to send and receive voice communications, data transmissions, facsimile messages and email messages virtually anywhere in earth. Such communication can be initiated at the telematics unit when it is turned on, or by entering a phone number to be called, or in some cases, by speaking a voice command to an automatic speech recognition system. In any case, the telematics unit automatically completes the process of dialing the number to be called, and thus establishes contact with the desired entity.

One limitation to using a telematics unit to retrieve email messages from a server-based information system is that attachments to the email message are generally not available to the user. This is due, in part to the fact that email attachments may be text, pictures, audio, or video recordings. It is therefore, necessary to first, download the attachment, and then route the attachment to a device that can make the content of the attachment available to the user.

It is therefore desirable to provide a system that would allow users to access email attachments in a vehicle.

SUMMARY OF THE INVENTION

One aspect of the invention presents a method for accessing email attachments from a vehicle. The method comprises receiving the email attachment from a remote server to a telematics control unit in the vehicle, determining the classification of the email attachment, and then routing the email attachment to a device that will make the content of the attachment available to the user.

Another aspect of the invention provides a computer readable medium for accessing email attachments from a vehicle. The computer readable medium comprises computer readable code within the vehicle telematics unit for receiving an email attachment that is stored on a remote server. The computer readable medium further comprises computer readable code for determining the classification of the email attachment, and routing the email attachment to one of a plurality of vehicle communication units based on the classification of the email attachment.

Another aspect of the invention provides a system for accessing an email attachment from a vehicle. The system comprises means for receiving an email attachment from a remote server, determining the classification of the email attachment, and routing the email attachment to one of a plurality of vehicle communication units based on the classification of the email attachment.

The foregoing and other features and advantages of the invention will become further apparent from the following detailed description of the embodiments of the invention, read in conjunction with the accompanying drawings. The detailed description and drawings are illustrative of the invention rather than limiting, the scope of the invention being defined by the appended claims and equivalents thereof.

BRIEF DESCRIPTION OF THE DRAWINGS

FIG. 2 is a flowchart outlining one embodiment of a method for accessing email attachments from a vehicle utilizing the system of FIG. 1 in accordance with the present invention; and FIG. 3 is a schematic diagram of an email attachment.

DETAILED DESCRIPTION OF THE INVENTION

Figure 1:
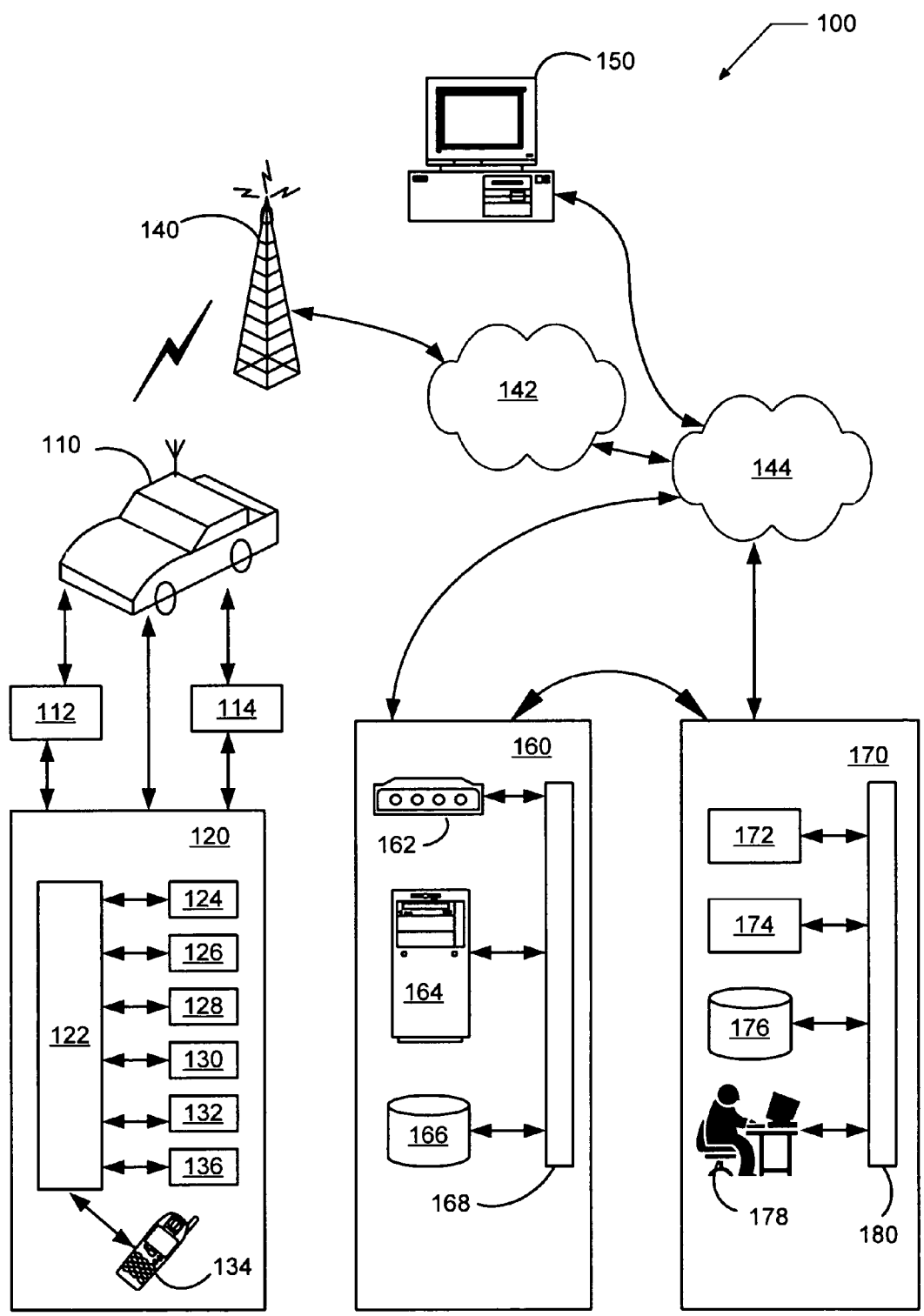
FIG. 1 is a schematic diagram for one embodiment of a system for accessing email attachments from a vehicle using a wireless communication system, in accordance with the present invention.

FIG. 1 is an illustrative operating environment for downloading an email to a mobile vehicle in an embodiment of the present invention. FIG. 1 shows a vehicle communication system 100. Vehicle communication system 100 includes at least one vehicle 110 including telematics unit 120, one or more wireless carrier systems 140, one or more communication networks 142, one or more land networks 144, one or more client, personal or user computers 150, one or more web-hosting portals 160, and one or more call centers 170. In one embodiment, vehicle 110 is implemented as a mobile vehicle equipped with suitable hardware and software for transmitting and receiving voice and data communications and emails.

Vehicle 110 is implemented as a motor vehicle, a boat, an airplane and any other mode of transportation. Vehicle 110 includes display screen 114. In one embodiment, display screen 114 is a portion of a vehicle navigation system and the navigation system further includes a map stored in memory (in one example, memory 128), and display software that can display the vehicle's current location on a display screen in the vehicle. The display screen 114 is implemented as a television in one embodiment, and is implemented as a monitor in other embodiments. The display screen may be any device configured to allow viewing of data or the visible output of computer files.

Vehicle 110 further includes audio device 112. Audio device 112 is implemented as any device configured to play sounds audible to the human ear. Audio device 112 is a stereo system in one embodiment. For example, the audio device 112 is a component of the entertainment system of vehicle 110. Both audio device 112 and display screen 114 are configured to provide the output of a computer file, such as an email attachment, in a form perceptible to a human. For example, audio device 112 is configured to "play" music files. Music files include files formatted as .mp3, .aiff, .ogg, and any other file format used to store audible information. In another example, display screen 114 is configured to visibly show the output of a computer file, such as an email attachment. For example, display screen 114 is configured to display text, pictures, or moving pictures from a computer file. Output for display screen 114, for example, comes from word processing files, spreadsheets and .mov files. Both audio device 112 and display screen 114 are configured to allow display of any appropriate file, or email attachment. In this application, the audio device 112 and display screen 114 are collectively referred to as a "communications unit."

In one embodiment, telematics unit 120 is a vehicle communications unit that includes a digital signal processor (DSP) 122 connected to a wireless modem 124, a global positioning system (GPS) unit 126, an in-vehicle memory 128, such as, for example, a non-volatile flash memory, a microphone 130, one or more speakers 132, an embedded or in-vehicle mobile phone 134, and a wireless access point node 136. DSP 122 is also referred to as a microcontroller, controller, host processor, ASIC, microprocessor, or vehicle communications processor. DSP 122, in certain embodiments, is a functional block in a processor. GPS unit 126 provides longitude and latitude coordinates of the vehicle, as well as a time stamp. In-vehicle mobile telephone system 134 is a cellular-type phone, such as, for example an analog, digital, dual-mode, dual-band, multi-mode or multi-band cellular phone. In another example, the mobile telephone system is an analog mobile telephone system operating over a prescribed band nominally at 800 MHz. In another example, the mobile telephone system is a digital mobile telephone system operating over a prescribed band nominally at 800 MHz, 900 MHz, 1900 MHz, or any suitable band capable of carrying digital cellular communications.

DSP 122 executes various computer programs and communication control and protocol algorithms that control communication, programming and operational modes of electronic and mechanical systems within vehicle 110. In one embodiment, DSP 122 is an embedded system controller. In another embodiment, DSP 122 controls communications between telematics unit 120, wireless carrier system 140, and call center 170. In another embodiment, DSP 122 controls communications between the wireless access point node 134 and nodes of a mobile ad hoc network. In one embodiment, a speech-recognition application is installed in DSP 122 to translate human voice input through microphone 130 into digital signals. DSP 122 generates and accepts digital signals transmitted between telematics unit 120 and a vehicle communication bus that is connected to various electronic modules in the vehicle 110. In one embodiment, the digital signals activate a programming mode and operation modes, as well as provide for data transfers. Memory 128 comprises an internal software flag.

Vehicle 110, via a vehicle communication bus, sends signals to various units of equipment and systems within vehicle 110 to perform various functions such as monitoring the operational state of vehicle systems, collecting and storing data from the vehicle systems, providing instructions, data and programs to various vehicle systems and calling from telematics unit 120. In facilitating interactions among the various communication and electronic modules, vehicle communication bus utilizes bus interfaces such as controller-area network (CAN), J1850, International Organization for Standardization (ISO) Standard 9141, ISO Standard 11898 for high-speed applications, and ISO Standard 11519 for lower speed applications.

Vehicle 110, via telematics unit 120, sends and receives radio transmissions from wireless carrier system 140. Wireless carrier system 140 is implemented as any suitable system for transmitting a signal from mobile vehicle 110 to communication network 142. Wireless carrier system 140 incorporates any type of telecommunications in which electromagnetic waves carry signal over part of or the entire communication path. In one embodiment, wireless carrier system 140 transmits analog audio, digital audio (including, but not limited to, CDMA, TDMA, FDMA, GSM), video signals, or both. In an example, wireless carrier system 140 transmits analog audio, video signals, or both, such as those sent from AM and FM radio stations and transmitters, or digital audio signals in the S band (approved for use in the U.S.) and L band (used in Europe and Canada). In one embodiment, wireless carrier system 140 is a satellite broadcast system broadcasting over a spectrum in the "S" band (2.3 GHz) that has been allocated by the U.S. Federal Communications Commission (FCC) for nationwide broadcasting of satellite-based Digital Audio Radio Service (DARS).

Communication network 142 includes services from one or more mobile telephone switching offices and wireless networks. Communication network 142 connects wireless carrier system 140 to land network 144. Communication network 142 is implemented as any suitable system or collection of systems for connecting wireless carrier system 140 to mobile vehicle 110 and land network 144. In one example, wireless carrier system 140 includes a short message service, modeled after established protocols such as IS-637 SMS standards, IS-136 air interface standards for SMS, and GSM 03.40 and 09.02 standards. Similar to paging, an SMS communication could be broadcast to a number of regional recipients. In another example, the carrier system 140 uses services in accordance with other standards, such as, for example, IEEE 802.11 compliant wireless systems and Bluetooth compliant wireless systems.

Land network 144 is a public-switched telephone network (PSTN). In one embodiment, land network 144 is implemented as an Internet protocol (IP) network. In other embodiments, land network 144 is implemented as a wired network, an optical network, a fiber network, another wireless network, or any combination thereof. Land network 144 is connected to one or more landline telephones. Land network 144 connects communication network 142 to user computer 150, web-hosting portal 160, and call center 170. Communication network 142 and land network 144 connects wireless carrier system 140 to web-hosting portal 160 and call center 170. Client, personal or user computer 150 includes a computer usable medium to execute Internet browser and Internet-access computer programs for sending and receiving data over land network 144 and optionally, wired or wireless communication networks 142 to web-hosting portal 160 and vehicle 110.

Web-hosting portal 160 includes one or more data modems 162, one or more web servers 164, one or more databases 166, and a network 168. In one embodiment, web-hosting portal 160 is connected directly by wire to call center 170, or connected by phone lines to land network 144, which is connected to call center 170. In another embodiment, web-hosting portal 160 is connected to call center 170 without a direct wire connection, but with a connection allowing communication between the call center 170 and the web-hosting portal 160. Web-hosting portal 160 is connected to land network 144 by one or more data modems 162. Land network 144 sends digital data to and from modem 162; data that is subsequently transferred to web server 164. In one implementation, modem 162 resides inside web server 164. Land network 144 transmits data communications between web-hosting portal 160 and call center 170.

Web server 164 receives various data requests or instructions from user computer 150 via land network 144. In alternative embodiments, user computer 150 includes a wireless modem to send data to web-hosting portal 160 through a wireless communication network 142 and a land network 144. Data is received by modem 162 and sent to one or more web servers 164. In one embodiment, web server 164 is implemented as any suitable hardware and software capable of providing web services to transmit and receive data from user computer 150 to telematics unit 120 in vehicle 110. Web server 164 sends to or receives data transmissions from one or more databases 166 via network 168. Web server 164 includes computer applications and files for managing emails to be sent to vehicle 110.

In one embodiment, one or more web servers 164 are networked via network 168 to distribute data or emails among its network components such as database 166. In an example, database 166 is a part of or a separate computer from web server 164. In one embodiment, web-server 164 sends emails to call center 170 via modem 162, and through land network 144.

Call center 170 is a location where many calls are received and serviced at the same time, or where many calls are sent at the same time. In one embodiment, the call center is a telematics call center, facilitating communications to and from telematics unit 120 in vehicle 110. In an example, the call center is a voice call center, providing verbal communications between an advisor in the call center and a subscriber in a mobile vehicle. In another example, the call center contains each of these functions. In other embodiments, call center 170 and web-hosting portal 160 are located in the same or different facilities.

Call center 170 contains one or more voice and data switches 172, one or more communication services managers 174, one or more communication services databases 176, one or more communication services advisors 178, and one or more networks 180.

Switch 172 of call center 170 connects to land network 144. Switch 172 transmits voice or data transmissions from call center 170, and receives voice or data transmissions from telematics unit 120 in mobile vehicle 110 through wireless carrier system 140, wireless access point node 136, or both, communication network 142, and land network 144. Switch 172 receives data transmissions from, and sends data transmissions to, one or more web-hosting portals 160. Switch 172 receives data transmissions from, or sends data transmissions to, one or more communication services managers 174 via one or more networks 180.

Communication services manager 174 is any suitable hardware and software capable of providing communication services to telematics unit 120 in mobile vehicle 110. Communication services manager 174 sends to or receives data transmissions from one or more communication services databases 176 via network 180. Communication services manager 174 sends to or receives data transmissions from one or more communication services advisors 178 via network 180. Communication services database 176 sends to or receives data transmissions from communication services advisor 178 via network 180. Communication services advisor 178 receives from or sends to switch 172 voice or data transmissions.

Communication services manager 174 facilitates one or more services, such as, but not limited to, enrollment services, navigation assistance, directory assistance, roadside assistance, business or residential assistance, information services assistance, emergency assistance, and communications assistance and vehicle data management services. Communication services manager 174 receives emails with attachments from a user via user computer 150, web-hosting portal 160, and land network 144. Communication services manager 174 transmits and receives operational status, instructions and other types of vehicle data to telematics unit 120 in vehicle 110 through wireless carrier system 140, communication network 142, land network 144. Telematics unit 120 communicates with call center 170 through wireless access point node 136 voice and data switch 172, and network 180. Communication services manager 174 stores or retrieves vehicle data and information from communication services database 176. Communication services manager 174 provides requested information to communication services advisor 178.

In one embodiment, communication services advisor 178 is a real advisor. In another embodiment, communication services advisor 178 is implemented as a virtual advisor. In an example, a real advisor is a human being at service provider service center in verbal communication with service subscriber in mobile vehicle 110 via telematics unit 120. In another example, a virtual advisor is implemented as a synthesized voice interface responding to requests from telematics unit 120 in vehicle 110.

Communication services advisor 178 provides services to telematics unit 120 in mobile vehicle 110. Services provided by communication services advisor 178 include enrollment services, navigation assistance, real-time traffic advisories, directory assistance, roadside assistance, business or residential assistance, information services assistance, emergency assistance, and communications assistance. Communication services advisor 178 communicates with telematics unit 120 in mobile vehicle 110 through wireless carrier system 140, communication network 142, and land network 144 using voice transmissions, or through communication services manager 174 and switch 172 using data transmissions. Switch 172 selects between voice transmissions and data transmissions.

FIG. 2 is a flowchart outlining one embodiment of a method 200 for downloading an email attachment to a vehicle and making it available to a user. The method begins at step 202 wherein the user contacts the call center from a mobile vehicle. In one embodiment of the invention, the user employs the telematics control unit in the mobile vehicle to send a signal through the carrier system, the communications network, and a land network. A communications services manager at the server-based call center receives the signal. Within the call center, the signal may be routed to the virtual advisor and to the database. If the user has an email profile stored in the database, the server determines whether the user has received one or more email messages with an attachment. The user, for example, contacts the call center to determine the existence of email addressed to the user. In other examples, the user contacts the call center for any other call center service, such as navigational assistance, and in the same contact checks for the existence of email addressed to the user. In other embodiments, the telematics unit 120 is configured to contact the call center at predetermined intervals, selectable by the user, to determine the existence of such email. For example, the telematics unit contacts the call center every 2 hours to check on email. In other examples, the telematics unit 120 contacts the call center as part of the wake cycle as is known to those of ordinary skill in the art.

If one or more email messages with an attachment have been received, the virtual advisor asks the user whether he/she would like to receive the email attachment, as indicated in step 204. The signal from the virtual advisor may be an electronic signal or may be verbal and audible if an automated speech recognition (ASR) unit is available within the call center. The signal from the virtual advisor is sent through the data transmission device in the call center to the user in the mobile vehicle. In one embodiment of the invention, the signal is sent through an Internet protocol network and a land network connected to a communication network and wireless carrier system, and is received at the telematics unit 120 in the user's mobile vehicle.

The user responds through the telematics unit by indicating either "yes" or "no" as indicated in step 206. The user may respond either verbally, by speaking into a telephone, or by pressing a button that sends an electronic signal. The user's response is sent to the call center by the telematics unit 120. If the user responds "no", as indicated in step 208, no further exchange of information takes place, and the sequence is terminated. If the user responds "yes", the call center initiates a sequence of actions to prepare to send the email attachment to the user's mobile vehicle.

As indicated in step 210; in response to a. "yes" signal from the vehicle telematics unit 120, the server in the call center identifies the attachment to be sent, and extracts the attachment from the email message. When the attachment is ready to be sent to the mobile vehicle, the call center server sends a download request signal to the vehicle telematics unit 120 indicating that the server is ready to send the attachment.

When the telematics unit 120 in the user's mobile vehicle receives the download request from the call center server, the telematics unit 120 responds by setting an internal software flag, as indicated in step 212 of FIG. 2. The internal software flag is computer code that triggers the sequence to download the attachment when the user's telephone call to the call center ends. When the user terminates the call to the call center, the attachment is sent from the call center server through the call center data transmission device to the mobile vehicle. The attachment is downloaded to the telematics unit 120 using a modem in the mobile vehicle, and temporarily stored in the random access memory 128 of the telematics unit 120, as indicated in step 214.

Once the email attachment is received in the telematics unit, the telematics unit 120 determines which communications unit within the mobile vehicle should be used to make the attachment available to the user, as shown in step 216.

As shown in FIG. 3, an email message 300 comprises the text message 302, and may optionally include an attachment 310 to the email message. Email attachment 310 may include elements that are audio, video, pictures, or text. The audio elements include sound files in .voc, .snd, .ogg, .cda and .mid format, music files in .ram, .wav, .wma, and mp3 format. The video medium includes files in .avi, .mpg, .wmv, and .aiff format. A file which has both audio and visual elements is treated as a visual file, with visible elements displayed via the display screen 114 and the audio elements played over audio device 112. Those of ordinary skill in the art will readily recognize the multitude of file formats used to store audio and visual files and understand that the invention is not limited by the file extension type.

Referring to FIG. 2, the telematics unit 120 has an internal lookup table that identifies the type of medium included in the attachment and determines whether the attachment is audio-only (sound or music), or whether there is also a visual element. The telematics unit 120 will route audio-only attachments to the audio device 112. Attachments having a visual component including video, pictures, or text will be routed to the display screen 114 by the telematics unit 120. Once the telematics unit 120 has made the determination, using computer code, it sets a bit in memory that routes the attachment to the selected communications unit. The attachment is then sent to the selected communications unit and is available to the user, as indicated in step 218 of FIG. 2. In one embodiment of the invention, if the attachment is audio-only, it is sent to the audio device 112, and the user can listen to the attachment through the radio speakers of the mobile vehicle sound module. If the attachment includes a visual element, the attachment is sent to the display screen 114.

After the attachment has been routed to the appropriate communications device, the attachment is deleted from the random access memory 128 of the vehicle telematics unit 120 and the internal software flag is deleted, as is indicated in step 220.

In one embodiment, when the mobile vehicle is turned off, the attachment is lost, and if needed, it must be downloaded again from the server. In other embodiments, the attachment is stored in non-volatile memory and preserved until affirmatively deleted by the user.

While the invention has been described with reference to particular embodiments, it will be understood by one skilled in the art that variations and modifications may be made in form and detail without departing from the spirit and scope of the invention.

What is claimed is:

1. A method for accessing an email attachment from a mobile vehicle, the method comprising:
   receiving an email attachment from a remote server at a vehicle telematics unit;
   determining at the vehicle a classification of the email attachment; and
   routing the email attachment within the vehicle based on the classification such that the email attachment is provided to a vehicle communication unit enabled to present the content of the email attachment.

2. The method of claim 1 further comprising receiving a notification signal at the telematics unit, and setting an internal software flag responsive to the notification signal.

3. The method of claim 2 wherein the internal software flag triggers receiving the email attachment at the mobile vehicle telematics unit.

4. The method of claim 1 wherein determining the classification of the email attachment comprises determining whether the file is an audio-only file and routing the attachment to one of a audio unit or display screen based on the determination.

5. The method of claim 4 further comprising setting a bit in a random access memory of the mobile vehicle telematics unit and thereby routing the email attachment to one of the audio unit or the display screen.

6. The method of claim 1 wherein the email attachment is temporarily stored in a random access memory within the telematics unit.

7. The method of claim 6 further comprising deleting the email attachment from the random access memory within the telematics unit after the email attachment has been routed to a vehicle communication unit.

8. A computer readable non-transitory medium storing a computer program for a system to receive email attachments at a vehicle, comprising:
   computer readable code for receiving an email attachment from a remote server at a vehicle telematics unit;
   computer readable code for determining at the vehicle a classification of the email attachment;
   computer readable code for routing the email attachment within the vehicle based on the classification such that the email attachment is provided to a vehicle communication unit enabled to present the content of the email attachment.

9. The computer readable non-transitory medium of claim 8 further comprising computer readable code to receive a notification signal at the telematics unit, and set an internal software flag responsive to the notification signal.

10. The computer readable non-transitory medium of claim 9 further comprising computer readable code for triggering receiving the email attachment at the vehicle telematics unit.

11. The computer readable non-transitory medium of claim 8 further comprising computer readable code for determining whether the file is an audio-only file and routing the attachment to one of a audio unit or display screen based on the determination.

12. The computer readable non-transitory medium of claim 11 further comprising computer readable code for setting a bit in the random access memory of the vehicle telematics unit and thereby routing the email attachment to one of the audio unit or the display screen.

13. The computer readable non-transitory medium of claim 8 further comprising computer readable code for storing an email attachment temporarily in a random access memory within the vehicle telematics unit.

14. The computer readable non-transitory medium of claim 13 further comprising computer readable code for deleting the email attachment from the random access memory within the telematics unit after the email attachment has been routed to a vehicle communication unit.

15. A system for accessing an email attachment from a vehicle, the system comprising:
   means for receiving an email attachment from a remote server at a vehicle telematics unit;
   means for determining at the vehicle a classification of the email attachment; and
   means for routing the email attachment within the vehicle based on the classification such that the email attachment is provided to a vehicle communication unit enabled to present the content of the email attachment.

16. The system of claim 15 further comprising means for receiving a notification signal at the telematics unit, and setting an internal software flag responsive to the notification signal.

17. The system of claim 16 further comprising means for triggering receiving the email attachment at the vehicle telematics unit.

18. The system of claim 15 further comprising means for determining whether the email attachment file is an audio-only file and routing the attachment to one of a audio unit or display screen based on the determination.

19. The system of claim 18 further comprising means for setting a bit in the random access memory of the vehicle telematics unit and thereby routing the email attachment to one of the audio unit or the display screen.

20. The system of claim 15 further comprising means for temporarily storing the email attachment in a random access memory within the telematics unit.

21. The system of claim 20 further comprising means for deleting the email attachment from the random access memory within the telematics unit after the email attachment has been routed to a vehicle communication unit.

* * * * *